Figure 1:
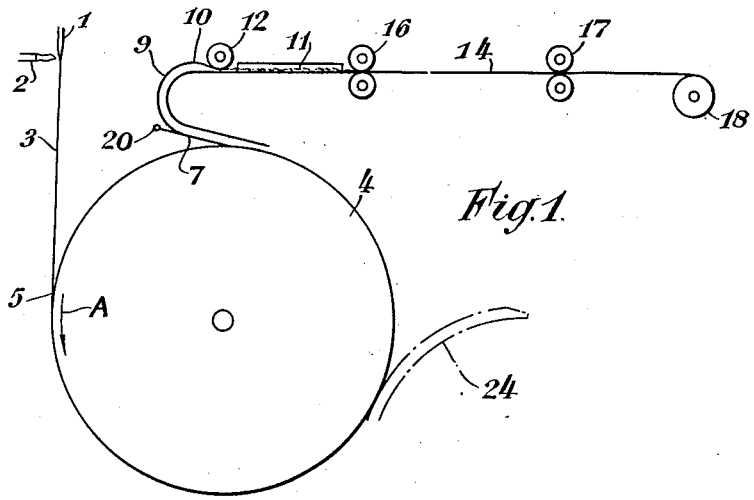

Dec. 16, 1952 W. SCHULLER 2,621,444
PROCESS AND APPARATUS FOR THE CONTINUOUS PRODUCTION
OF A SLIVER OR ROVING FROM FIBERS OF
GLASS, PLASTIC OR LIKE SUBSTANCES
Filed April 19, 1949 2 SHEETS—SHEET 1

Inventor.
Werner Schuller.
Morgan Finnegan & Durham
Attorney.

Dec. 16, 1952            W. SCHULLER            2,621,444
PROCESS AND APPARATUS FOR THE CONTINUOUS PRODUCTION
OF A SLIVER OR ROVING FROM FIBERS OF
GLASS, PLASTIC OR LIKE SUBSTANCES
Filed April 19, 1949            2 SHEETS—SHEET 2
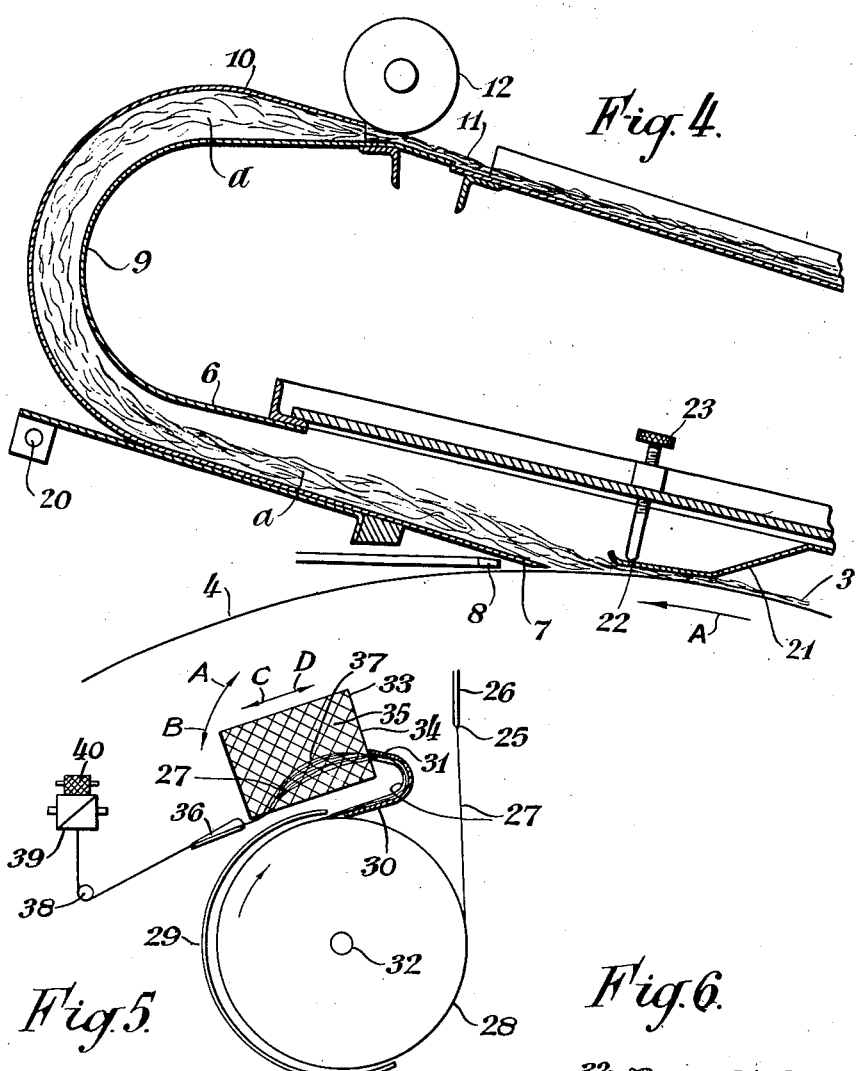
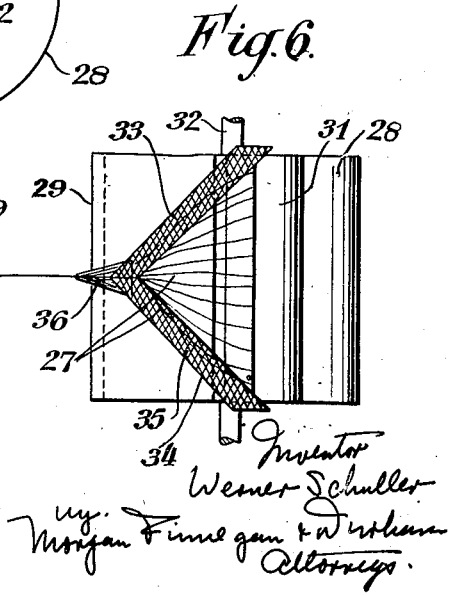

Patented Dec. 16, 1952

2,621,444

UNITED STATES PATENT OFFICE 2,621,444

PROCESS AND APPARATUS FOR THE CONTINUOUS PRODUCTION OF A SLIVER OR ROVING FROM FIBERS OF GLASS, PLASTIC, OR LIKE SUBSTANCES

Werner Schuller, Banstead, England

Application April 19, 1949, Serial No. 89,514
In Great Britain April 21, 1948

7 Claims. (Cl. 49—17)

It is known to run glass filaments from a production point onto a rotating drum and to collect them in a funnel positioned transversely of the direction of rotation of the drum, and to draw them out of this funnel in the form of a sliver or roving. The glass filaments are removed from the rotating drawing drum by means of a tongue scraper or similar device, and the current of air produced by the rotation of the drawing drum conveys the glass filaments into the interior of the funnel. In the interior of the funnel, this current of air moves partly vertically and partly in the opposite direction to the drawing direction of the sliver, and thereby produces in the interior of the funnel whirling currents of air, which cause a certain felting of the fibres and prevent a good parallel positioning of the fibres in the nap, and subsequently in the strip of fibre. Parts of the fibres are also removed and lost by action of the air passing out to the side. Slivers with fibres as nearly as possible parallel are required where fine yarns are to be produced in a subsequent spinning process.

These disadvantages are overcome according to the process and apparatus of the invention, in which the glass fibres are moved in the direction of the air stream by the current of air produced in the rotation of the drum through a collecting device lying substantially in the direction of flow of the air and are guided to a receiving and conveying device.

Figure 2:
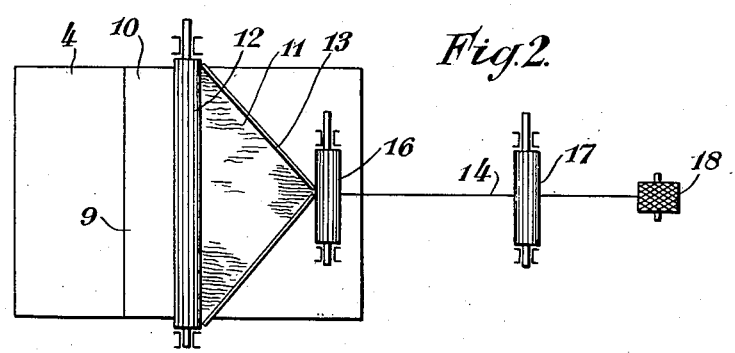
Figure 3:
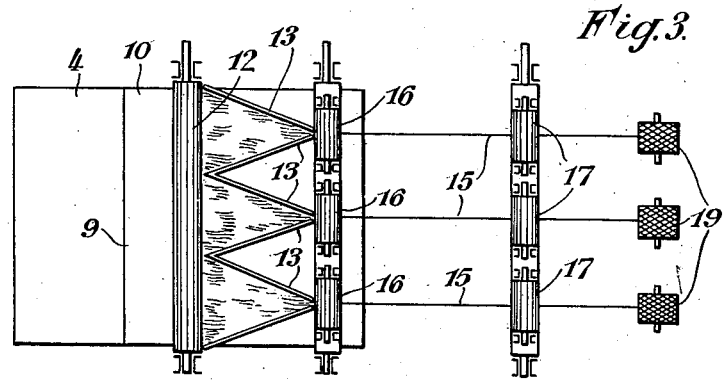

The invention is diagrammatically illustrated by way of example in the accompanying drawings, in which:

Figure 1 is a side elevation of apparatus constructed according to the invention, Figures 2 and 3 are plan views corresponding to Figure 1 and of a modified construction, Figure 4 is a part longitudinal section on an enlarged scale, Figure 5 is a side elevation of modified guide means according to the invention, and Figure 6 is a corresponding plan view from above.

Referring to the drawings, 1 represents the ends of glass rods arranged side by side in rows and brought to the melting point by any suitable form of heating device 2, so that glass filaments 3 are formed, which are drawn-off by the drawing drum 4 rotating in the direction of the arrow A. Any other method for the production of the glass filaments may be used, such for example as the spinning nozzles of a small furnace containing molten glass.

In the apparatus of the invention, a collecting device 6 (Figure 4) is provided at a distance beyond the position 5 (Figure 1) where the glass filaments contact the drawing drum 4—in the illustrated example this position is on the upper half of the periphery of the drum. The device 6 collects the glass filaments continuously arriving across the whole width of the drawing drum. The collecting device 6 is provided with a tongue or scraper 7, which alone or in conjunction with a current of compressed air passing out of a nozzle 8 (Figure 4) at a position below the knife and directed in the opposite direction to that of the rotation of the drawing drum 4, detaches the glass filaments 3 from the drum 4. The stream of air created by the rotation of the drawing drum moving in the direction of the arrow A, guides the glass filaments 3—lying substantially in the direction of the air stream—into the collecting device and moves them on in this same direction. At this position they are separated into staple fibres of different lengths under the action of the tongue or scraper 7. Figure 4 shows how the glass fibres are diverted by an elbow 9 and guided through a nozzle 10, so that a fibre lap 11 covering the entire width of the drum, emerges. The lap 11 is gripped and conveyed by one or more conveying and receiving rollers 12. Beyond the rollers 12 are provided collecting members 13 which direct the fibre lap into a sliver or roving 14 (Figure 2) or into several slivers or rovings 15 (Figure 3). Rotating rollers, advantageously rubber rollers, 16 and 17, are provided which stretch the slivers or rovings 14 and 15 before they are spooled respectively at 18 and 19.

The collecting device 6 may be mounted above the drawing drum 4. An effective method of application is that by which the collecting device 6 is provided so that it can pivot on a pin 20 and lies with the tongue or scraper 7, (under its own weight, which can—if necessary—be partly balanced), resting on the periphery of the drawing drum 4.

As a strong current of air is created by the high speed of rotation of the drawing drum 4, the influence of this air stream on the glass filaments is, according to the invention lessened, by means of a diverting plate 21 (Figure 4) provided in front of the position of entry of the filaments into the collecting device 6. If necessary, the distance 22 of the plate 21 from the periphery of the drawing drum 4 may be altered, by screw adapter 23, to correspond to the speed of rotation of the drum.

The invention is not limited to the construction of collecting device 6 by which—as shown in Figures 1 and 4—the direction of the glass fibres is diverted before being drawn out to a sliver. This construction permits of the arrangement of the series of glass rods with their supporting and conveying means, and also the burners at one side of and above the drawing drum in the manner illustrated. It is however possible to dispose the glass rods at another position, namely horizontally, or to pass the glass filaments out at another position, as by being conveyed substantially in the direction of the air stream generated by the rotation of the drum with slight deviation.

In the modified construction illustrated in Figures 5 and 6, 25 is a position where a thread is originated or created, for example the ends of a series of glass rods 26; 27 are filaments drawn therefrom; 28 is a drawing drum, and 29 a shield or apron partly surrounding the drum.

The filament collecting driver 30, 31 serves also to guide the air generated by the rotation of the drawing drum in such manner that the filaments removed from the drawing drum are conveyed in directions as parallel as possible and in planes essentially perpendicular to the axis 32 of the drawing drum. The filaments may be diverted upwardly through about 90°.

In the example shown, the end member 31 of the collecting device is disposed at an angle of 150° to 160° to the starting end 30 of the device, thus causing a complete reversal in the direction of the movement of threads. The advantage may thus be obtained that the parts of the device for further treating the threads may be disposed within clear and convenient reach with respect to the drawing drum.

An essential part of modified construction is an air permeable device 33 consisting for example of a V- or wedge-shaped frame 34, 35 made of wire gauze 35 or the like. The device 33 is mounted immediately beyond the member 31 and collects the filaments 27, diverted by the device, and guides them to a nozzle 36, the air stream acting as the conveyor of the filaments 27 passing through the wire gauze frame 34, 35 of said frame 34. The filaments 27 are conveyed by the air stream generated by the rotation of the drum in an arc as indicated at 37, and then fall towards the under edge of the device 33 owing to a pull of a drawing device acting at this position. The general construction of the collecting device is unessential provided it is able to cope with the problem of collecting the threads arriving on a wide front across the width of the drawing drum at the inlet and concentrating them to a narrow compass at the outlet.

From the nozzle 36, the sliver is conducted by means of a guide roller 38 to a spooling and pulling device, such for example as a changeover roller 39, and a spool 40, where the filaments are wound up crosswise. It is essential that the filaments as they pass from the drawing drum up to the position in which they are collected into a sliver are subjected to no torsion, or substantially no torsion, so as to ensure that they lie as far as possible parallel in the sliver.

Care is taken that the device 33 is adapted to be raised on a centre or pivot at its forward edge in each direction as indicated by the arrows A and B, and is also adapted to be adjusted in the direction of the arrows C and D in order to enable the correct adjustment to be made with respect to the device 30, 31, according to the individual factors of the device for producing the filaments according to the number of rotations of the drawing drum, thickness of filament, force and volume of air stream caused by the rotation of the drum, and the like.

The apparatus according to the invention affords the following advantages:

By the air stream generated by rotation of the drawing drum filaments are guided along in substantially parallel relation the walls of the wire frame and after being separated from the drawing drum 28 are prevented from crossing each other and from becoming twisted by air streaming across or obliquely to the longitudinal direction of movement of the threads. By the apparatus of the invention the filaments are treated, touched or moved as little as possible; this is of particular importance owing to the delicate nature of the glass filaments. Thus it is possible to manufacture particularly long staples, as for example between 100 to 500 millimeters in length. Owing to the long staples and the fact that the filaments be closely parallel in the sliver it is possible to manufacture particularly fine yarn into a larger number of filaments, the long staples preventing breaking even should a heavy pull be exerted during the spinning operation.

I claim:

1. Apparatus for the continuous production of a sliver or roving from filaments or fibres made of glass or substances having similar physical characteristics, including a drawing drum rotating at a speed to generate an air flow around the periphery of said drum, means for raising said filaments from said drum, a collecting and guiding device formed as a V-shaped tray with perforated walls and open at the top with the broad open part of the tray forming the inlet for the filaments and being positioned adjacent the periphery of the drum and a funnel or gap being formed at the other end of said tray through which said filaments are conveyed by the air flow to conveying and receiving means.

2. A process for the continuous production of a sliver or roving from glass filaments or fibres or from substances having similar physical characteristics, comprising forming the filaments or fibres from a source of filament supply, rotating a drawing drum, drawing said filaments from said supply by feeding filaments by gravity to the periphery of the drum to lie thereon in substantially parallel relation, shielding part of the periphery of the drum, scraping the fibres from the periphery of the drum after travel of said fibres around the shielded part of the periphery of the drum thus forming staple fibers, utilising the air generated by the rotation of the drum to draw the fibres off the drum, reversing the direction of flow of filaments drawn by the air stream created by the rotation of the drum and guiding the air stream and the filaments floating freely therein through a restricted outlet by means of which the filaments are formed into a single sliver or roving.

3. Apparatus for the continuous production of a sliver or roving from filaments made of glass or a substance having similar physical characteristics comprising a source of filament supply, a rotating drum positioned beneath said source of supply, jets for forming filaments from said source of supply, said filaments on formation falling by gravity tangentially on to the periphery of said drum, means for rotating said drum, a shield covering part of the periphery of the drum on the side opposite that on which the glass filaments fall on to the drum, means for scraping the glass filaments off the surface of the drum as they leave the shelter of the shielded portion of the periphery of the drum to form staple fibres, a sharply curved guide for reversing the direction of flow of the filaments drawn by the air stream created by the rotation of the drum, and for drawing together the filaments to form a single sliver or roving.

4. Apparatus for the continuous production of a sliver or roving from filaments made of glass or a substance having similar physical characteristics comprising a source of filament supply, a rotating drum positioned beneath said source of supply, jets for forming filaments from said source of supply, said filaments on formation falling by gravity tangentially on to the periphery of said drum, means for rotating said drum, a shield covering part of the periphery of the drum on the side opposite that on which the glass filaments fall onto the drum, means for scraping the glass filaments off the surface of the drum as they leave the shelter of the shielded portion of the periphery of the drum to form staple fibres, a V-shaped tray with a wide entrance for the filaments and a narrow outlet, said tray being bent back into a hairpin, for reversing the direction of flow of the filaments drawn by the air stream created by rotation of the drum, and for drawing together the filaments to form a single sliver or roving.

5. Apparatus according to claim 3 including a wedge-shaped frame adjacent said guide for collecting the filaments as they leave the guide means.

6. Apparatus according to claim 3 including means for receiving the filaments being discharged from said guide and means for conveying said filaments to a spool.

7. Apparatus according to claim 5 including a collecting nozzle adjacent said wedge shape frame for collecting the filaments as they leave the wedge-shaped frame.

WERNER SCHULLER.

REFERENCES CITED

The following references are of record in the file of this patent:

UNITED STATES PATENTS

| Number | Name | Date |
|---|---|---|
| 1,923,183 | Blum | Aug. 22, 1933 |
| 2,048,651 | Norton | July 21, 1936 |
| 2,132,702 | Simpson | Oct. 11, 1938 |
| 2,398,808 | Slayter et al. | Apr. 23, 1946 |
| 2,450,915 | Powell | Oct. 12, 1948 |
| 2,460,899 | Modigliani et al. | Feb. 8, 1949 |